US010469568B2

(12) United States Patent
Jenkins

(10) Patent No.: US 10,469,568 B2
(45) Date of Patent: Nov. 5, 2019

(54) SYSTEM AND METHOD TO REDUCE BANDWIDTH REQUIREMENT FOR VISIBILITY EVENT PACKET STREAMING USING A PREDICTED MAXIMAL VIEW FRUSTUM AND PREDICTED MAXIMAL VIEWPOINT EXTENT, EACH COMPUTED AT RUNTIME

(71) Applicant: PRIMAL SPACE SYSTEMS, INC., Raleigh, NC (US)

(72) Inventor: Barry Lynn Jenkins, Raleigh, NC (US)

(73) Assignee: PRIMAL SPACE SYSTEMS, INC., Raleigh, NC (US)

( * ) Notice: Subject to any disclaimer, the term of this patent is extended or adjusted under 35 U.S.C. 154(b) by 0 days.

(21) Appl. No.: 15/631,940

(22) Filed: Jun. 23, 2017

(65) Prior Publication Data

US 2017/0295222 A1 Oct. 12, 2017

Related U.S. Application Data

(63) Continuation of application No. 14/842,557, filed on Sep. 1, 2015, now abandoned, which is a
(Continued)

(51) Int. Cl.
*G06T 15/40* (2011.01)
*H04L 29/08* (2006.01)
(Continued)

(52) U.S. Cl.
CPC ............ *H04L 67/10* (2013.01); *A63F 13/355* (2014.09); *G06F 3/011* (2013.01); *G06F 3/1454* (2013.01);
(Continued)

(58) Field of Classification Search
CPC .............................. G06T 19/003; G06T 15/40
See application file for complete search history.

(56) References Cited

U.S. PATENT DOCUMENTS 6,028,608 A 2/2000 Jenkins
6,118,456 A 9/2000 Cooper
(Continued)

OTHER PUBLICATIONS

Koltun, Vladlen, Yiorgos Chrysanthou, and Daniel Cohen-Or. "Virtual occluders: An efficient intermediate pvs representation." Rendering Techniques 2000. Springer, Vienna, 2000. 59-70. (Year: 2000).*
(Continued)

*Primary Examiner* — Ryan McCulley
(74) *Attorney, Agent, or Firm* — Oblon, McClelland, Maier & Neustadt, L.L.P.

(57) ABSTRACT

There is provided a method of predictive prefetching and transmitting from a server to a client device at least one partial visibility event packet and/or deferred visibility event packet including renderable graphics information occluded from a first viewcell and not occluded from a second viewcell, including otherwise renderable graphics information in a client view frustum not previously transmitted to the client device; determining an estimated maximal client view frustum; calculating a subset comprising renderable graphics information that is included in the estimated maximal client view frustum; determining whether the calculated subset has previously been transmitted to the client device by comparing the calculated subset to the stored renderable graphics information previously transmitted, and transmitting the at least one partial visibility event packet and/or deferred visibility event packet to the client device if said packet has not been previously transmitted to the client device.

14 Claims, 15 Drawing Sheets

Related U.S. Application Data continuation-in-part of application No. 14/754,419, filed on Jun. 29, 2015, now Pat. No. 9,852,538, and a continuation-in-part of application No. 13/445,792, filed on Apr. 12, 2012, now Pat. No. 9,171,396, said application No. 14/754,419 is a continuation-in-part of application No. 13/420,436, filed on Mar. 14, 2012, now abandoned, said application No. 13/445,792 is a continuation-in-part of application No. 13/420,436, filed on Mar. 14, 2012, now abandoned, which is a continuation-in-part of application No. PCT/US2011/051403, filed on Sep. 13, 2011, and a continuation-in-part of application No. PCT/US2011/042309, filed on Jun. 29, 2011.

(60) Provisional application No. 62/044,349, filed on Sep. 1, 2014, provisional application No. 61/476,819, filed on Apr. 19, 2011, provisional application No. 61/474,491, filed on Apr. 12, 2011, provisional application No. 61/452,330, filed on Mar. 14, 2011, provisional application No. 61/384,284, filed on Sep. 19, 2010, provisional application No. 61/382,056, filed on Sep. 13, 2010, provisional application No. 61/360,283, filed on Jun. 30, 2010.

(51) Int. Cl.

| | | |
|---|---|---|
| *H04L 29/06* | (2006.01) | |
| *H04L 12/751* | (2013.01) | |
| *G06F 3/01* | (2006.01) | |
| *A63F 13/355* | (2014.01) | |
| *G06T 15/20* | (2011.01) | |
| *G06T 19/00* | (2011.01) | |
| *G06F 3/14* | (2006.01) | |

(52) U.S. Cl.
CPC .............. *G06T 15/20* (2013.01); *G06T 15/40* (2013.01); *G06T 19/003* (2013.01); *H04L 45/08* (2013.01); *H04L 67/42* (2013.01); *G06T 2200/16* (2013.01); *G06T 2210/08* (2013.01); *G06T 2210/36* (2013.01); *G09G 2350/00* (2013.01); *G09G 2360/122* (2013.01); *G09G 2370/022* (2013.01)

(56) References Cited

U.S. PATENT DOCUMENTS

| | | |
|---|---|---|
| 2010/0201696 A1 | 8/2010 | Kent |
| 2012/0249556 A1* | 10/2012 | Chandak ...................... 345/473 |
| 2013/0321593 A1 | 12/2013 | Kirk |
| 2014/0267429 A1 | 9/2014 | Justice |
| 2016/0219325 A1 | 7/2016 | Chu |

OTHER PUBLICATIONS

Leyvand, Tommer, Olga Sorkine, and Daniel Cohen-Or. Ray space factorization for from-region visibility. vol. 22. No. 3. ACM, 2003. (Year: 2003).*

Cohen-Or, Daniel, et al. "A survey of visibility for walkthrough applications." IEEE Transactions on Visualization and Computer Graphics 9.3 (2003): 412-431.

Durand, Freda, et al. "Conservative visibility preprocessing using extended projections." Proceedings of the 27th annual conference on Computer graphics and interactive techniques. ACM Press/Addison-Wesley Publishing Co., 2000.

Gobbetti, Enrico, Dave Kasik, and Sung-eui Yoon. "Technical strategies for massive model visualization." Proceedings of the 2008 ACM symposium on Solid and physical modeling. ACM, 2008.

Li Tsai-Yen, and Wen-Hsiang Hsu. "A data management scheme for effective walkthrough in large-scale virtual environments." The Visual Computer 20.10 (2004): 624-634.

Nurminen, Antti. "Mobile, hardware-accelerated urban 30 maps in 3G networks." Proceedings of the twelfth international conference on 30 web technology. ACM, 2007.

Zach, Christopher, and Konrad Karner. "Prefetching policies for remote walkthroughts." (2002).

Zheng. Zhi, and Tony KY Chan. "Optimized neighbour prefetch and cache for client-server based walkthrough." Cyberworlds, 2003. Proceedings. 2003 International Conference on. IEEE. 2003.

Zheng, Zhi, Prakash Edmond, and Tony Chan. "Interactive view-dependent rendering over networks." IEEE Transactions on Visualization and Computer Graphics 14.3 (2008): 576-589.

* cited by examiner

SYSTEM AND METHOD TO REDUCE BANDWIDTH REQUIREMENT FOR VISIBILITY EVENT PACKET STREAMING USING A PREDICTED MAXIMAL VIEW FRUSTUM AND PREDICTED MAXIMAL VIEWPOINT EXTENT, EACH COMPUTED AT RUNTIME

CROSS-REFERENCE TO RELATED APPLICATIONS

This application is a continuation of U.S. application Ser. No. 14/842,557, filed on Sep. 1, 2015, which claims the benefit of priority under 35 U.S.C. § 119(e) to U.S. Provisional Application No. 62/044,349, filed on Sep. 1, 2014. This application is also a continuation-in-part application of U.S. nonprovisional application Ser. No. 14/754,419, filed on Jun. 29, 2015, and a continuation-in-part application of U.S. nonprovisional application Ser. No. 13/445,792, filed on Apr. 12, 2012, each of which is in turn a continuation-in-part application of U.S. nonprovisional application Ser. No. 13/420,436, filed on Mar. 14, 2012, which in turn is a continuation-in-part of PCT application no. PCT/US2011/042309, filed on Jun. 29, 2011, which itself claims the benefit of priority to U.S. provisional application No. 61/360,283, filed on Jun. 30, 2010. U.S. nonprovisional application Ser. No. 13/420,436 is also a continuation-in-part application of PCT application no. PCT/US2011/051403, filed on Sep. 13, 2011, which itself claims the benefit of priority to U.S. provisional application No. 61/382,056, filed on Sep. 13, 2010, and to U.S. provisional application No. 61/384,284, filed on Sep. 19, 2010. U.S. nonprovisional application Ser. No. 13/420,436 also claims the benefit of priority to U.S. provisional application No. 61/452,330, filed on Mar. 14, 2011, U.S. provisional application No. 61/474,491, filed on Apr. 12, 2011, and U.S. provisional application No. 61/476,819, filed on Apr. 19, 2011. The entirety of each of the above-indicated applications is incorporated herein by reference.

BACKGROUND

Field

This application relates to a method and system for predictive prefetching and transmitting at least one partial visibility event packet and/or at least one deferred visibility event packet from a server to a client device, the at least one partial visibility event packet being a subset of a complete visibility event packet, the complete visibility event packet including renderable graphics information occluded from a first viewcell and not occluded from a second viewcell among a plurality of viewcells.

Description of Background

In a 3D model of a densely occluded environment, most of the renderable surfaces are completely occluded from any viewpoint located in a small region that is deeply immersed in the environment. This relationship is exploited by the referenced copending U.S. application Ser. Nos. 14/754,419, 13/445,792, and 13/420,436, which describe a method of interactively delivering renderable surfaces to a client unit by pre-computing surfaces that become unoccluded if a viewpoint moves from one small navigable region (viewcell) to an adjacent small navigable region of the model. This precomputed information is stored as visibility event (VE) packets, which can later be streamed interactively to a remote client using scalable, adaptive, perception-based VE packet streaming methods described in copending U.S. application Ser. Nos. 14/754,419, 13/445,792, and 13/420,436.

The copending U.S. application Ser. Nos. 13/420,436 and 13/445,792 specify how the payload of these visibility event packets can be reduced if camera rotation is pre-limited by a maximal view direction vector extent that is prescribed within each viewcell. In this method, the maximum extent of the view frustum is used to limit the precomputation of potentially-visible-set (PVS) data within a viewcell, or delta-PVS data across viewcell boundary. The method pre-computes the visibility event packet data, in one embodiment, using a conservative model of visibility propagation. This visibility propagation model can incorporate a predetermined, prescribed maximal view frustum extent in order to restrict the determination of from-viewcell visibility, and thus reduce VE packet payloads when camera view direction vector is pre-limited.

The method of using pre-limited view direction vectors to compute smaller VE packets can be useful for streaming in-game-engine cutscene material with a fixed or limited view direction vector. Camera models in which the trajectory of the viewpoint may be limited to a prescribed space curve, and for which camera view direction vector rotation is limited, are common in "rail shooter" games or episodes of games that provide relatively restricted camera motion. In the general case of a walkthrough or flythrough visualization, however (e.g., first-person, open-world games), a view direction vector is not restricted. In the general case, the view direction vector can be pointed in any direction for any viewpoint within any viewcell.

SUMMARY

In exemplary embodiments, there is provided a method, conducted on a server, of predictive prefetching and transmitting at least one partial visibility event packet from the server to a client device, the at least one partial visibility event packet being a subset of a complete visibility event packet, the complete visibility event packet including renderable graphics information occluded from a first viewcell and not occluded from a second viewcell among a plurality of viewcells, the method comprising: a) storing, using storage circuitry, information representing a current client view frustum; b) storing, using the storage circuitry, renderable graphics information previously transmitted to the client device; c) determining, using a processor, from the information representing the current client view frustum, an estimated maximal client view frustum comprising a volume of space intersected by a maximum possible movement of the current client view frustum during a delay period of time at least equal to a round-trip-time of data communication between the server and the client device; d) calculating, using the processor, the subset of the complete visibility event packet comprising renderable graphics information that is included in the estimated maximal client view frustum; e) determining, using the processor, whether the calculated subset has previously been transmitted to the client device by comparing the calculated subset to the stored renderable graphics information previously transmitted to the client device; and f) transmitting, to the client device, the at least one partial visibility event packet comprising the calculated subset of the complete visibility event packet, if the calculated subset has not been previously transmitted to the client device.

In exemplary embodiments, such a method may further comprise determining the estimated maximal client view frustum by: c1) determining, using the processor, a conservative maximal viewpoint extent comprising a representation of the maximal possible subregion of the second viewcell occupied by a client viewpoint during the delay period; c2) determining, using the processor, a conservative maximal view direction vector rotation comprising a representation of a maximal rotational extent of the client view direction vector during the delay period; and c3) calculating, using the processor, the estimated maximal client view frustum from the conservative maximal viewpoint extent and the conservative maximal view direction vector rotation.

In exemplary embodiments, such a method may also further comprise g) storing, using the storage circuitry, a complete data set for each viewcell of the plurality of viewcells that is predictively penetrated by the client viewpoint, as determined by the conservative maximal viewpoint extent, the complete data set representing a complete potentially visible set for said each viewcell of the plurality of viewcells; h) storing, using the storage circuitry, an incomplete data set for said each viewcell of the plurality of viewcells that is predictively penetrated by the client viewpoint, as determined by the conservative maximal viewpoint extent, the incomplete data set representing, for said each viewcell, a subset of the calculated data set actually transmitted to the client device in step f), i) calculating, using the processor, at least one deferred visibility event packet for said each viewcell of the plurality of viewcells that is predictively penetrated by the client viewpoint, by comparing the complete data set to the incomplete data set, the at least one deferred visibility event packet including, for said each viewcell, a subset of the complete potentially visible set not previously transmitted to the client device; j) determining, using the processor, for said each viewcell of the plurality of viewcells that is predictively penetrated by the client viewpoint, whether renderable graphics information of the at least one deferred visibility event packet intersects the estimated maximal client view frustum; and k) transmitting, to the client device, the at least one deferred visibility event packet when the renderable graphics information of the at least one deferred visibility event packet intersects the estimated maximal client view frustum.

In exemplary embodiments, there is also provided a method, conducted on a client device, of receiving at least one partial visibility event packet from a server, the at least one partial visibility event packet being a subset of a complete visibility event packet, the complete visibility event packet including renderable graphics information occluded from a first viewcell and not occluded from a second viewcell among a plurality of viewcells, the method comprising: a) transmitting to the server, using a processor, client view information representing a current client view frustum; b) transmitting to the server, using the processor, data comprising at least one of a current client view direction vector and a current client viewpoint location; and c) receiving, from the server, the at least one partial visibility event packet comprising renderable graphics information that intersects a maximal client view frustum, wherein the maximal client view frustum comprises a volume of space intersected by a maximum possible movement of the current client view frustum, based on said at least one of the current client view direction vector and the current client viewpoint location, during a delay period of time at least equal to a round-trip-time of data communication between the server and the client device.

In exemplary embodiments, such a method may further comprise: d) receiving, from the server, at least one deferred visibility event packet for said each viewcell of the plurality of viewcells that is predictively penetrated by the client viewpoint, the at least one deferred visibility event packet including, for said each viewcell, a subset of the complete potentially visible set not previously received from the server, wherein the subset includes renderable graphics information of the at least one deferred visibility event packet that intersects the maximal client view frustum.

In exemplary embodiments, such a method may also further comprise: g) storing, using the storage circuitry, a complete data set for each viewcell of the plurality of viewcells that is predictively penetrated by the client viewpoint, as determined by the conservative maximal viewpoint extent, the complete data set representing a complete potentially visible set for said each viewcell of the plurality of viewcells; h) storing, using the storage circuitry, an incomplete data set for said each viewcell of the plurality of viewcells that is predictively penetrated by the client viewpoint, as determined by the conservative maximal viewpoint extent, the incomplete data set representing, for said each viewcell, a subset of the complete data set actually transmitted to the client device in step f); i) calculating, using the processor, at least one deferred visibility event packet for said each viewcell of the plurality of viewcells that is predictively penetrated by the client viewpoint, by comparing the complete data set to the incomplete data set, the at least one deferred visibility event packet including, for said each viewcell, a subset of the complete potentially visible set not previously transmitted to the client device; j) determining, using the processor, for said each viewcell of the plurality of viewcells that is predictively penetrated by the client viewpoint, whether renderable graphics information of the at least one deferred visibility event packet intersects the estimated maximal client view frustum; and k) transmitting, to the client device, the at least one deferred visibility event packet when the renderable graphics information of the at least one deferred visibility event packet intersects the estimated maximal client view frustum.

In exemplary embodiments, there is also provided a method, conducted on a client device, of receiving at least one partial visibility event packet from a server, the at least one partial visibility event packet being a subset of a complete visibility event packet, the complete visibility event packet including renderable graphics information occluded from a first viewcell and not occluded from a second viewcell among a plurality of viewcells, the method comprising: a) transmitting to the server, using a processor, client view information representing a current client view frustum; b) transmitting to the server, using the processor, data comprising at least one of a current client view direction vector and a current client viewpoint location, and c) receiving, from the server, the at least one partial visibility event packet comprising renderable graphics information that intersects a maximal client view frustum, wherein the maximal client view frustum comprises a volume of space intersected by a maximum possible movement of the current client view frustum, based on said at least one of the current client view direction vector and the current client viewpoint location, during a delay period of time at least equal to a round-trip-time of data communication between the server and the client device.

In exemplary embodiments, such a method may also further comprise: d) receiving, from the server, at least one deferred visibility event packet for said each viewcell of the plurality of viewcells that is predictively penetrated by the client viewpoint, the at least one deferred visibility event packet including, for said each viewcell, a subset of the complete potentially visible set not previously received from the server, wherein the subset includes renderable graphics information of the at least one deferred visibility event packet that intersects the maximal client view frustum.

In exemplary embodiments, there is also provided a method, conducted on a client device, of receiving at least one partial visibility event packet from a server, the at least one partial visibility event packet being a subset of a complete visibility event packet, the complete visibility event packet including renderable graphics information occluded from a first viewcell and not occluded from a second viewcell among a plurality of viewcells, the method comprising: a) determining, using a processor, client view information representing a current client view frustum and at least one of a current client view direction vector and a current client viewpoint location; b) determining, from the client view information, a maximal view frustum comprising a volume of space intersected by a maximum possible movement of the current client view frustum, based on said at least one of the current client view direction vector and the current client viewpoint location, during a delay period of time at least equal to a round-trip-time of data communication between the server and the client device, c) transmitting to the server, using the processor, data representing the maximal view frustum; and d) receiving, from the server, the at least one partial visibility event packet comprising renderable graphics information that intersects the maximal client view frustum.

In exemplary embodiments, there is also provided a method, conducted on a server, of predictive prefetching and transmitting at least one partial visibility event packet from the server to a client device, the at least one partial visibility event packet being a subset of a complete visibility event packet, the complete visibility event packet including renderable graphics information occluded from a first viewcell and not occluded from a second viewcell among a plurality of viewcells, the method comprising: a) receiving, from the client device, client view information representing a current client view frustum and at least one of a current client view direction vector and a current client viewpoint location; b) determining, using a processor, from the client view information, an estimated maximal client view frustum comprising a volume of space intersected by a maximum possible movement of the current client view frustum during a delay period of time at least equal to a round-trip-time of data communication between the server and the client device; c) calculating, using the processor, the subset of the complete visibility event packet comprising renderable graphics information that is included in the estimated maximal client view frustum; and d) transmitting, at a first time, to the client device, a reduced level-of-detail representation of the at least one partial visibility event packet comprising the calculated subset of the complete visibility event packet that intersects the estimated maximal view frustum.

In exemplary embodiments, such a method may also further comprise: transmitting, at a second time later than the first time, to the client device, the at least one partial visibility event packet comprising the calculated subset as a high level-of-detail representation of the subset of the renderable graphics information.

In exemplary embodiments, such a method may also further comprise: transmitting, at a third time, to the client device, at least one deferred visibility event packet for said each viewcell of the plurality of viewcells that is predictively penetrated by the client viewpoint, the at least one deferred visibility event packet including, for said each viewcell, a subset of the complete visibility event packet that intersects the estimated maximal view frustum and that has not been previously transmitted to the client device, wherein the complete visibility event packet comprises an additive combination of the at least one partial visibility event packet and the at least one deferred visibility event packet.

In exemplary embodiments, such a method may also further comprise: transmitting, at a third time, to the client device, a reduced level-of-detail representation of the at least one deferred visibility event packet comprising the calculated subset of the complete visibility event packet that intersects the estimated maximal view frustum.

In exemplary embodiments, such a method may also further comprise: transmitting, at a fourth time later than the third time, to the client device, the at least one deferred visibility event packet comprising the calculated subset as a high level-of-detail representation of the subset of the renderable graphics information.

DETAILED DESCRIPTION OF THE EMBODIMENTS

Figure 1:
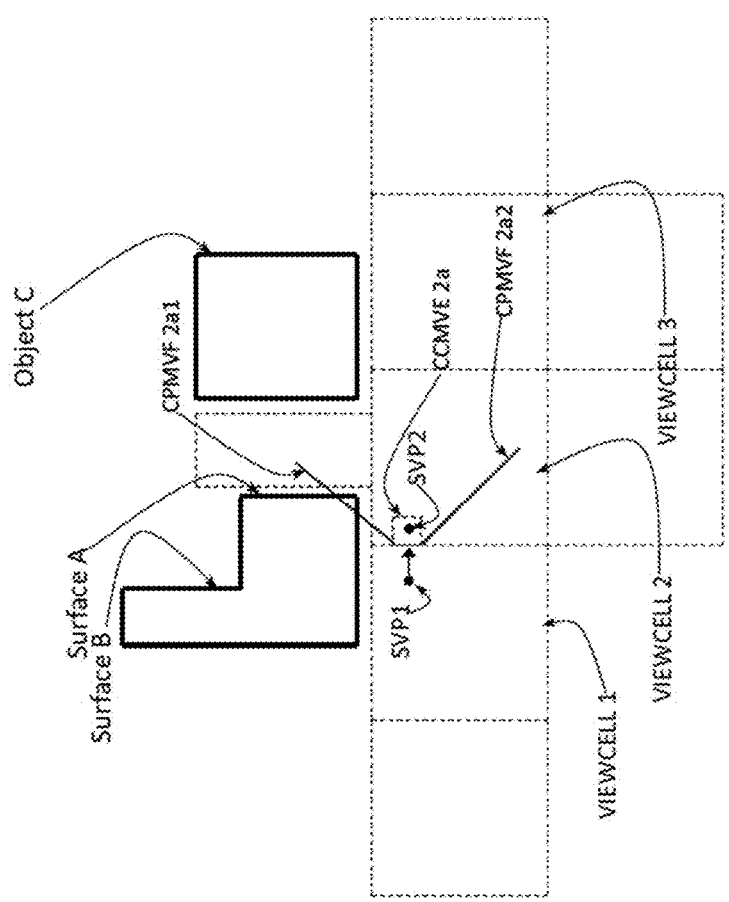
FIG. 1 is an exemplary diagram showing several viewcells from which portions of surfaces may be occluded from visibility when making a viewcell to viewcell transition with a maximal view frustum facing the direction of movement, according to an embodiment.

In exemplary embodiments, there is described a method to reduce bandwidth requirements for visibility event packet streaming using a predicted maximal view frustum and a predicted maximal viewpoint extent, each computed at runtime to determine a conservative subset of visibility event packet data transmitted.

For example, as described herein, a system includes a server and a client computer device. The server delivers renderable graphics information to the client. The renderable graphics information comprises precomputed delta-PVS (potentially visible set) information organized as visibility event packets that are predictively prefetched from the server to the client based on navigation prediction. The precomputed visibility event packet information includes information comprising the renderable surfaces that become unoccluded on crossing a specific boundary between contiguous viewcells. This visibility event packet information is used to incrementally maintain a collection of PVSs corresponding to viewcells reachable by the client-user viewpoint.

In exemplary embodiments, the visibility event packet information is precomputed assuming that the view direction vector can assume any orientation within a viewcell. At runtime, the server computes a conservative estimate of the client's maximal view frustum during penetration of a viewcell using the linear and angular velocities and accelerations of the client's viewpoint and view direction vector. The conservative estimate of the client's view frustum is used to determine the subset of the precomputed, omnidirectional visibility event packet information that should be sent to the client, and the subset for which the sending can be deferred. The server maintains a copy of the client's PVS information for each viewcell. At runtime, the conservative estimate of the client's view frustum is tested against the server's copy of the client's PVS to determine if any previously deferred renderable surfaces now intersect the current conservative estimate of the client's view frustum and should consequently be sent to the client.

While the view direction vector has unrestricted range in these cases, it takes a certain amount of time for the view frustum to sweep out a full 360 degree squared directional extent, for example, while the camera/viewpoint is within a specific viewcell. The present disclosure exploits the finite angular velocity and angular acceleration of the view frustum to reduce bandwidth requirements by transmitting only a partial visibility event packet at any given time, the partial visibility event packet being a subset of a complete visibility event packet. The partial visibility event packet may be a subset of the pre-computed VE packet data at any given time.

This partial visibility event packet or subset is limited to that portion of the renderable surfaces of the corresponding visibility event packet that has not yet been transmitted and which currently intersects a maximal view frustum, the maximal view frustum computed to be a conservative representation of the largest potential volume of 3-space intersected by the view frustum as the user/client viewpoint moves within the corresponding viewcell, and as the user/client view direction vector rotates within the corresponding viewcell.

Also consistent with the disclosed embodiments, the present disclosure exploits the finite angular velocity and angular acceleration of the view frustum to reduce bandwidth requirements by deferring transmission of visibility event packets. Such deferred visibility event packets may include, for said each viewcell, a subset of the complete potentially visible set not previously transmitted.

Here, the deferred visibility event packets are also limited to that portion of the renderable surfaces of the corresponding visibility event packet that has not yet been transmitted and which currently intersects a maximal view frustum. Further, the deferred visibility event packets, if transmitted, would complete the client's PVS representation for a currently occupied viewcell. For example, the client's PVS representation may have become incomplete due to previous transmission of only partial visibility event packets. Consequently, the server may determine that the deferred visibility event packets constitute the client's complete PVS minus any previously untransmitted packets or partial packets.

Therefore, consistent with the disclosed embodiments, partial visibility event packets may be understood as a subset of a complete visibility event packet, the complete visibility event packet including renderable graphics information occluded from a first viewcell and not occluded from a second viewcell among a plurality of viewcells. The partial visibility event packets may thus be understood as those packets which omit some renderable graphics information, however, when such information does not intersect with the maximal view frustum when crossing or predictively crossing a viewcell to viewcell boundary.

Likewise, consistent with the disclosed embodiments, deferred visibility event packets may be understood as a subset of a complete visibility event packet not previously transmitted. Such packets may not have been previously transmitted because, while they too may include renderable graphics information, such information also did not intersect with the maximal view frustum when crossing or predictively crossing a viewcell to viewcell boundary at the time when the partial visibility event packets were sent.

Thus, while the incorporated disclosure of copending U.S. application Ser. Nos. 14/754,419, 13/445,792, and 13/420, 436 describes transmitting precomputed complete visibility event packets, which reflect the entire set of newly unoccluded surfaces that could become visible upon crossing a viewcell to viewcell boundary, the disclosed embodiments herein enable significant improvements in computational efficiency and significantly reduced bandwidth requirements for streaming transmission of visibility event packets, by initially transmitting only partial visibility event packets in which otherwise renderable surfaces of the client's PVS have been culled because they are outside the maximal view frustum. And, the disclosed embodiments herein enable significant improvements in computational efficiency and significantly reduced bandwidth requirements for streaming transmission of visibility event packets, by deferring transmission of visibility event packets or partial visibility event packets until such time as the renderable surfaces of the client's PVS therein would be within a conservative estimate of the client's maximal view frustum due to changes concomitant with client movement within a given viewcell.

Consistent with an embodiment, the maximal view frustum is determined by the predicted extent of two separate components during viewpoint motion within the corresponding viewcell. The first component is the current maximal predicted sweep of the view direction vector. This component is dependent upon the initial angular kinetic state of the view direction vector on making the corresponding transition between adjacent viewcells, on any known changes in this state during movement in the viewcell, and also on the maximum angular velocity, acceleration, and jerk (second derivative of the angular velocity). The second component is the current maximal predicted extent of the viewpoint within the corresponding viewcell. This component is dependent upon the location of penetration of the viewcell, the initial linear velocity, on any known changes of these values during movement within the viewcell, as well as the maximum linear velocity, acceleration, and jerk (second derivative of the viewpoint linear velocity).

Using these values in a Newtonian kinetic model, a conservative current maximal view frustum can be computed at various times during viewpoint and view direction movement within the corresponding viewcell. Consistent with an embodiment, the current conservative maximal view frustum is determined by the server unit, as a conservative server-based representation of the client user's actual maximal view frustum-considering both maximal possible viewpoint penetration into the corresponding viewcell as well as maximal view direction vector rotation during penetration of the corresponding viewcell. The server also executes a process in which in which the current maximal view frustum is used to classify untransmitted surfaces of the corresponding VE packet in order to determine which surfaces of the VE packet should be prefetched at the current time. By using a conservatively predicted current maximal view frusta, the subsets are selected and sent before they intersect with the actual instantaneous client-side view frustum. This prefetch prevents late VE packet arrival.

The server-side prediction of current maximal view direction vector and current maximal viewpoint extent must, of course, take into account ping latency between the visibility event server and the visibility event client. At higher latencies, there are greater angular and linear/translational regions of uncertainty, which is reflected in larger predicted conservative regions calculated for the current maximal view direction vector and current maximal viewpoint extents. The method also accommodates embodiments in which a Boolean difference constructive solid geometry calculation is used to determine the difference between consecutive maximal frustra for intersecting unsent surfaces. This difference volume is smaller than the aggregate maximal frustum for the entire traversal period of the viewcell, but it can be time consuming to compute. The resulting difference volume can be highly irregular and more difficult to use as a culling volume.

Turning now to FIG. 1, even if a surface (e.g., surface A in FIG. 1) is part of the pre-computed visibility event packet for a particular viewcell-viewcell transition (e.g., in FIG. 1, surface A becomes potentially visible on moving from viewcell 1 to viewcell 2), and even if this surface is inside the conservative current maximal view frustum, the surface may not actually be visible from the current viewpoint within the frustum. That is, while surface A may be unoccluded and within the frustum, it may be backfacing (i.e., facing away) with respect to the current conservatively predicted viewpoint extent. For example, FIG. 1 shows that at least part of Surface A is within the maximal conservative predicted view frustum (CPMVF), which is bounded in the horizontal plane by CPMVF 2a1 and CPMVF 2a2. However, in the example of FIG. 1, Surface A is backfacing with every possible viewpoint located within the conservative maximal viewpoint extent CCMVE 2a, and is therefore invisible from the current predicted viewpoint in VIEWCELL 2.

Thus, in the example shown in FIG. 1, Surface A is an element in the VE packet corresponding to the transition from viewcell 1 to viewcell 2. It is a potentially newly-visible surface on moving across the boundary shared by viewcell 1 and viewcell 2 in the direction from viewcell 1 to viewcell 2.

FIG. 1 shows two client viewpoint locations SVP1 and SVP2, as determined by the server unit. The size of the viewpoints represents a region, zone, or sphere of uncertainty that is related to the round trip ping time between the server and the client, as well as the kinetics and navigational degree of freedom of viewpoint motion.

During a given period of time, the server's estimate of the viewpoint location changes from SVP1 to SVP2, which corresponds to a penetration of the boundary between VIEWCELL 1 and VIEWCELL 2. The conservative current maximal viewpoint extent (CCMVE) predicted by the server a short time after the current time corresponding to SVP2 is shown as the small volume CCMVE 2a within VIEWCELL 2. This conservative current maximal viewpoint extent (CCMVE) reflects not only the intrinsic uncertainty due the ping latency, but additionally reflects the current and maximum achievable velocity and acceleration of the client-user controlled viewpoint. In some implementations, the computation of the current maximal viewpoint extent also considers the current and maximum achievable turning velocity and acceleration (which can be identical to the view direction vector velocity and acceleration, in some embodiments).

The current predicted maximal conservative view frustum (CPMVF) is determined from the current client-user view direction vector, as well as the current angular velocity and acceleration of this vector, and the maximal values for the angular velocity and acceleration of this vector. The current predicted maximal conservative view frustum corresponding to CCMVE 2a is, in the horizontal plane, bounded by the conservative frustum boundaries CPMVF 2a1 and CPMVF 2a2. Thus, as described earlier, while Surface A is within the current conservative predicted maximal viewcell frustum, Surface A is actually backfacing with respect to the current conservative maximal viewpoint extent CCMVE 2a. Therefore, Surface A is actually invisible from CCMVE 2*a* as a consequence of this backfacing orientation.

In the example shown in FIG. 1, the actual horizontal view angle is 90 degrees and the maximum rotational velocity of the view direction vector is 90 degrees per second. Also in the example shown in FIG. 1, the ping time between the server and the client is 100 ms. Consequently, the predicted frustum may be in error by as much as 9 degrees in either direction in the horizontal plane. To compensate for this intrinsic uncertainty, the horizontal angle of the conservative predicted maximal frustum is increased by at least 18 degrees (9 degrees on each side) from 90 degrees to 108 degrees, immediately upon penetration of viewcell 2. This angle can then be further increased with time based on the initial directional state, maximal rotational kinetic parameters, and hang time in the viewcell.

Consistent with the diagram shown in FIG. 1, in order to actually be visible from a current conservatively predicted viewpoint, a surface must be: 1) unoccluded, 2) within the predicted current maximal view frustum, and 3) have an orientation that is not backfacing with respect to the current predicted viewpoint extent. Exemplary embodiments of the present method exploit condition number 3 by precomputing which surfaces become unoccluded on moving across specific viewcell boundaries. This information is stored as visibility event (VE) packets. Exemplary embodiments of the present method employ the methods of the copending applications, including copending U.S. application Ser. Nos. 14/754,419, 13/445,792, and 13/420,436, to precompute this information at a level of precision and granularity suitable for real-time streaming of the packets using navigation-driven predictive prefetch.

Exemplary embodiments of the present method also exploit condition number 3 by testing that a surface in the VE packet is a) within the current predicted maximal view frustum, and b) not backfacing with respect to the current predicted maximal viewpoint extent.

Note that while Surface A is not backfacing for all viewpoints located in VIEWCELL 2, it is backfacing for a substantial portion of VIEWCELL 2, including CCMVE 2*a*. The method of computing a current conservative maximal viewpoint extent within a viewcell can be effectively employed when the transit time through the viewcell is substantially greater than the ping time between the server and the client. In this case, there is generally sufficient time to determine the subset of VE packet surfaces that have not been sent and that are not backfacing with respect to the evolving current conservative maximal viewpoint volume.

Likewise, the method of determining and sending, at runtime, unsent surfaces of the VE packet that are within the evolving conservative current maximal view frustum extent can be employed when transit times in the viewcell are substantially larger than the ping time, and where the maximal rotational velocity and acceleration of the view direction vector are modest (e.g., at a maximum of about 90-100 degrees per second).

Also, placing reasonable limits on the linear velocity of the viewpoint and angular velocity of the view direction vector actually improves human visual performance, which is limited at high viewpoint velocity and high view direction vector velocities by dynamic visual acuity constraints. Exemplary embodiments of the present method incorporate specific techniques which exploit the limited performance of the human visual system at high view direction velocities. These techniques are described in a later section of this disclosure.

For exemplary embodiments of the present method, placing reasonable limits on the viewpoint and view direction vector velocities enhances the predictability of the navigation and decreases the size of both the conservative maximal viewpoint volume and the conservative maximal predicted view frusta. For the present method, these reasonable limits on locomotive performance can significantly decrease the transmission bandwidth requirement for VE packet streaming. In exemplary embodiments of the present method, this reduced transmission bandwidth requirement is used to transmit higher level-of-detail representations of the newly visible surfaces, precisely under conditions when the client-side human visual system or robotic visual system can actually perceive the additional detail.

Conversely, during periods of relatively high linear and angular velocities, the size of the predicted penetration regions and predicted maximal frusta will increase. But, under these conditions, exemplary embodiments of the present method will transmit lower level-of-detail VE packets. Under such conditions, only the lower level-of-detail can be perceived by the client-side visual system. In this way, exemplary embodiments of the present method exploit the similar spatio-temporal performance characteristics of the visibility event protocol and human (and robotic) vision systems to minimize the bandwidth required to deliver a perceptually lossless visibility event packet stream.

In exemplary embodiments, there is also described a method to reduce bandwidth requirements for visibility event packet streaming using a predicted maximal view frustum and predicted maximal viewpoint extent, each computed at runtime-in conjunction with maintaining a complete version of an incrementally constructed PVS on the server.

The runtime conservative frustum and conservative viewpoint extent methods are used to prevent the transmission of invisible surfaces of a VE packet during viewpoint motion with a single viewcell. The disclosed method exploits the fact that, although the surfaces of a VE packet are potentially visible from at least one viewpoint located in the corresponding viewcell, the predicted maximal extent of penetration into the viewcell as well as the predicted maximal view frustum can actually make many of the surfaces of the corresponding VE packet currently invisible to the client-user viewpoint and view frustum.

The disclosed method can therefore be used to defer transmission of significant portions of the visibility event packet. Overall, however, the visibility event protocol defined by a navigation-driven predictive prefetch of pre-computed VE packets is intrinsically an incremental and progressive method of streaming the content. Consequently, the disclosed method delivers a series of partial and/or deferred VE packets that reflect the (predicted) penetration of a corresponding sequence of viewcell-to-viewcell boundaries. When the runtime conservative culling methods are employed, some parts of a VE packet corresponding to a first viewcell boundary may go untransmitted, even as the viewpoint (i.e., predicted viewpoint) penetrates later transited viewcell boundaries.

For example, FIG. 1 shows Surface A and Surface B, both of which are occluded from view from the view frustum perspective of VIEWCELL 1 but are not necessarily occluded from the view frustum perspective of VIEWCELL 2. Therefore, portions of both Surface A and Surface B would be represented in the newly visible (i.e., newly unoccluded) surfaces component of the VE packet corresponding to the viewcell boundary transition from VIEWCELL 1 to VIEWCELL 2. That is, these surfaces would be in the newly-occluded surfaces component of the VE packet corresponding to the viewcell boundary transition from VIEWCELL 2 to VIEWCELL 1.

Figure 2:
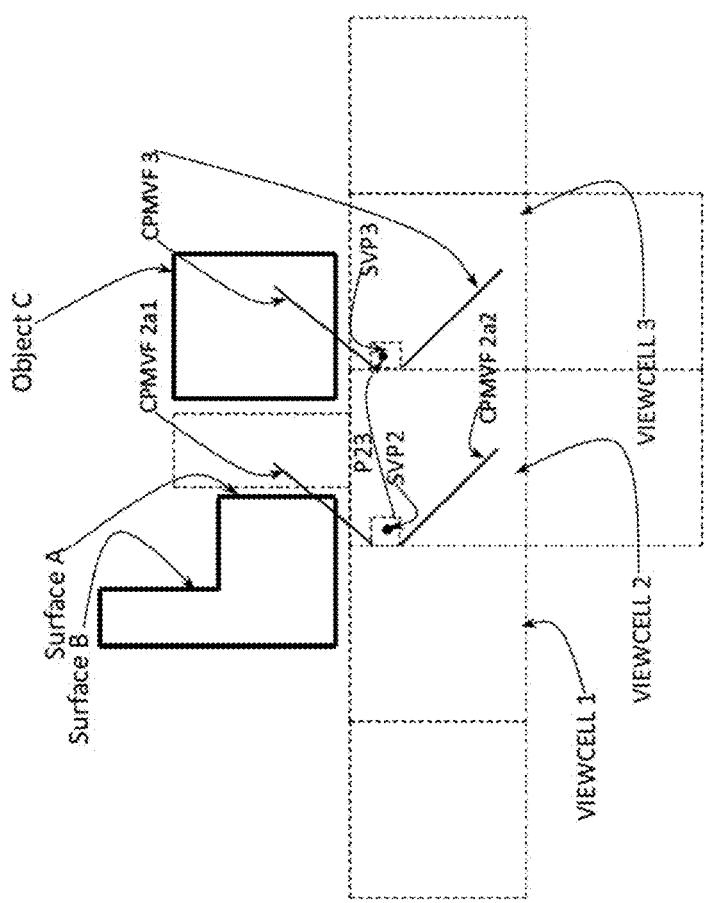
FIG. 2 is an exemplary diagram showing several viewcells from which different portions of surfaces may be occluded from visibility when making another viewcell to viewcell transition with a maximal view frustum facing the direction of movement, according to an embodiment.

FIG. 2 shows the same viewcells and surfaces as represented in FIG. 1, as well as the path taken by the viewpoint from the view frustum perspective as it transits through VIEWCELL 2. The viewpoint transit path P23 is shown in FIG. 2, as well as the resulting location of the predicted viewpoint SVP3, for the indicated conservative current maximal viewcell extent (CCMVE2) and a corresponding conservative current maximal view frustum (CPMVF3) for transit to VIEWCELL 3. During the viewpoint movement through VIEWCELL 2 along path P23, there is depicted little view direction vector rotation of the view frustum. Consequently, neither Surface A nor Surface B are visible from the current predicted viewpoint location and predicted view direction vector when the viewpoint transits into VIEWCELL 3.

Figure 3:
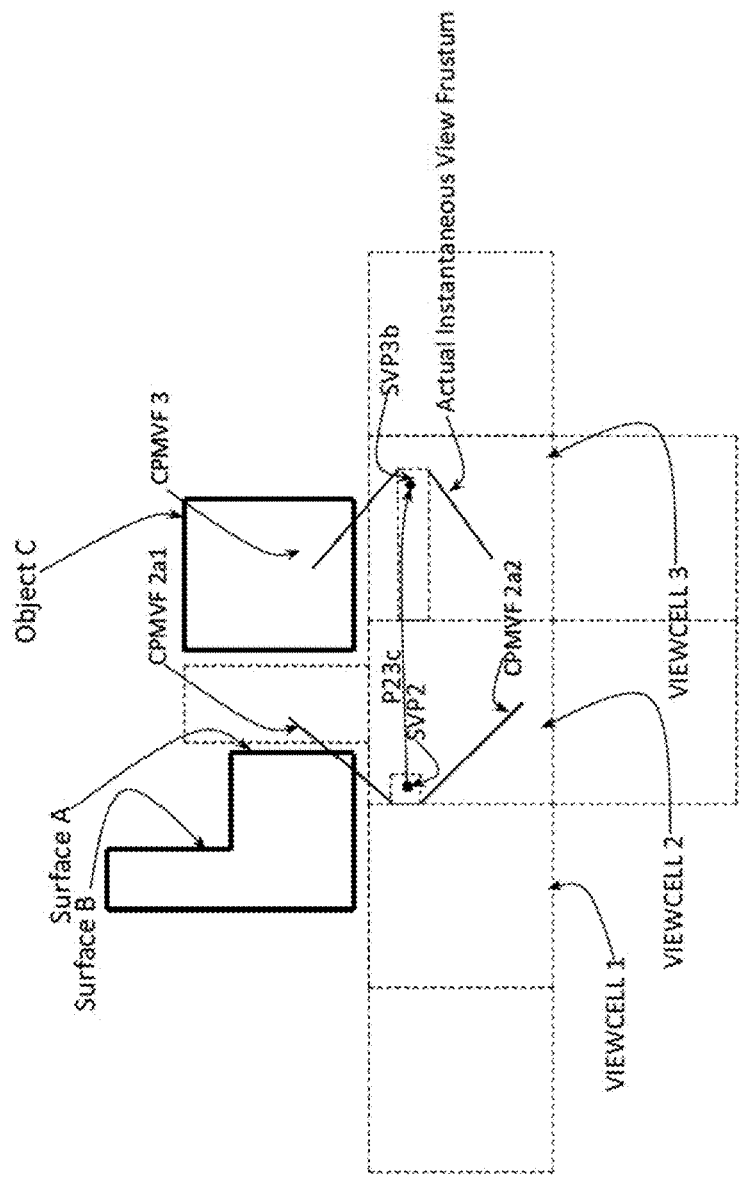
FIG. 3 is an exemplary diagram showing several viewcells from which different portions of surfaces may be occluded from visibility when making yet another viewcell to viewcell transition, this time with a maximal view frustum rotated 180 degrees compared to the direction of movement shown in FIG. 2, according to an embodiment.

FIG. 3 shows a further evolution of a conservatively predicted viewpoint and view direction vector motion within VIEWCELL 3, relative to the depiction shown in FIG. 2. As shown in FIG. 3, the view direction vector has rotated approximately 180 degrees during penetration of the client-user viewpoint into VIEWCELL 3, relative to the view direction vector shown in FIG. 2. However, the actual instantaneous view frustum shown in FIG. 3 is not a predicted maximal view frustum. Rather, the predicted maximal view frustum now essentially fills much of the volume of the modeled space as a consequence of the approximately 180 degrees of view direction vector rotation while the client-user viewpoint is within VIEWCELL 3. Clearly, a portion of Surface A is visible from viewpoint SVP3b, which is the predicted conservative maximal viewpoint penetration into VIEWCELL 3. However, in this case, Surface A has not been transmitted from the server to the client. Surface A is instead represented as a newly exposed surface for the VIEWCELL 1 to VIEWCELL 2 transition VE packet.

In other words, because it never passed the frustum test it was never transmitted. Note that Surface A would eventually pass the backfacing test along path P23c, but the position of the surface is such that when it passes the backfacing test, it fails the frustum test. Consequently, Surface A was not transmitted to the client by the time the viewpoint entered VIEWCELL 3, that is, Surface A is not a newly visible surface for the VIEWCELL 2 to VIEWCELL 3 transition. Therefore, consistent with exemplary embodiments of the disclosed method, as the view direction vector undergoes rotation while in VIEWCELL 3, Surface A would pass the frustum test, but as a consequence of the failed frustum test during the entire transition through VIEWCELL 2, it has not yet been sent to the client.

Thus, when employing the disclosed method of using runtime predicted view frusta and/or predicted maximal viewpoint extents, the incrementally constructed PVS for any viewcell maintained by the client may be incomplete, since some deferred surfaces have not been transmitted.

One solution to this problem is to test, on the server, all deferred surfaces belonging to the PVS of the current (and/or predicted) viewcell representative of unoccluded surfaces whose transmission has been deferred by the backfacing or frustum tests against the current predicted maximal frustum & maximal viewcell extent, in order to determine if these previously deferred surfaces should be predictively prefetched.

In the examples of FIGS. 1-3, Surface A became newly unoccluded during the VIEWCELL 1 to VIEWCELL 2 transition. For example, Surface A may be represented as a newly-unoccluded surface in the VE packet for the VIEWCELL 1 to VIEWCELL 2 transition using the methods described in copending U.S. application Ser. Nos. 14/754,419, 13/445,792, and 13/420,436, and remains potentially visible (unoccluded) from VIEWCELL 3. Surface A is not included as either newly-unoccluded or newly-occluded surface for the VE packet corresponding the VIEWCELL 2 to VIEWCELL 3 transition.

In exemplary embodiments of the disclosed method, the deferred surfaces that must be prefetched are identified by maintaining a "shadow PVS" on the server for all penetrated viewcells. This shadow PVS contains the omnidirectional PVS (that is, the complete PVS assuming an omnidirectional view frustum) for each actually penetrated viewcell, or viewcells for which the navigation prediction algorithm has predicted penetration. In the shadow PVS maintained by the server, each surface is tagged as already prefetched or currently deferred. The maximal predicted viewcell extent and maximal predicted frustum test are conducted on the server against the deferred surfaces of the shadow PVS for the current viewcell, and the deferred surfaces of the PVS that pass these tests are prefetched to the client.

Note that because the PVS is typically larger than the delta-PVS or dPVS (Visibility Event packets, per se), the frustum testing incurs additional compute cycles on the server, but results in lower bandwidth requirements for VE packet streaming. Of course, only the deferred elements of the PVS need to be subjected to these server-side tests, the deferred elements can be pre-labeled and clustered for fast processing.

Moreover, a conservatively predicted maximal view frustum cull test conducted on the server can be performed in $\text{Log } N_V$ time with any basic hierarchical spatial subdivision or hierarchical bounding box organization. The "V" subscript indicates that the cull is much faster than the typical per-frame frustum cull that occurs in the graphics pipeline for rendering a game level, since in this case the occluded surfaces have already been removed by the visibility event packet encoding process, as described in the exemplary embodiments of copending U.S. application Ser. Nos. 14/754,419, 13/445,792, and 13/420,436.

Turning back to the example of FIG. 3, the deferred Surface A is transmitted when the frustum test is passed, but Surface B is not transmitted because, although it is part of the PVS for VIEWCELL 2, it becomes occluded in the VIEWCELL 2 to VIEWCELL 3 transition, and thus is not represented in the server-side shadow PVS for VIEWCELL 3. In this case, Surface B, which is a newly unoccluded surface for the delta-PVS VE packet corresponding to the VIEWCELL 1 to VIEWCELL 2 transition, is never actually prefetched, because it has been removed from the shadow-PVS corresponding to VIEWCELL 3 by the time it would pass the predicted frustum test.

Together, these techniques, implemented in an exemplary embodiment of the disclosed method, exploit the fact that visibility of a surface requires the surface to be: 1) unoccluded, 2) in the frustum, and 3) not backfacing. Of these three elements of visibility, the most extensive to compute is occlusion. Existing real-time graphics hardware typically relies on a z-buffer method of resolving occlusion at the pixel level. This can be very inefficient for rendering densely occluded environments. Consequently, modern graphics systems incorporate several runtime methods including: z-pass, early z rejection, occlusion queries, and other runtime methods, to reduce the amount of occluded surfaces submitted to the later stages of the rendering pipeline. In contrast, exemplary embodiments of the disclosed method employ a high-precision process to precompute occlusion, e.g., with application of the methods of copending U.S. application Ser. Nos. 14/754,419, 13/445,792, and 13/420, 436, which reduces the need for expensive runtime occlusion culling methods. This approach also accelerates the other two visibility tests of frustum inclusion and front facing orientation, since when using the PVSs maintained by the visibility event packets, the vast majority of occluded surfaces are not included in the frustum or backface tests.

Figure 4:
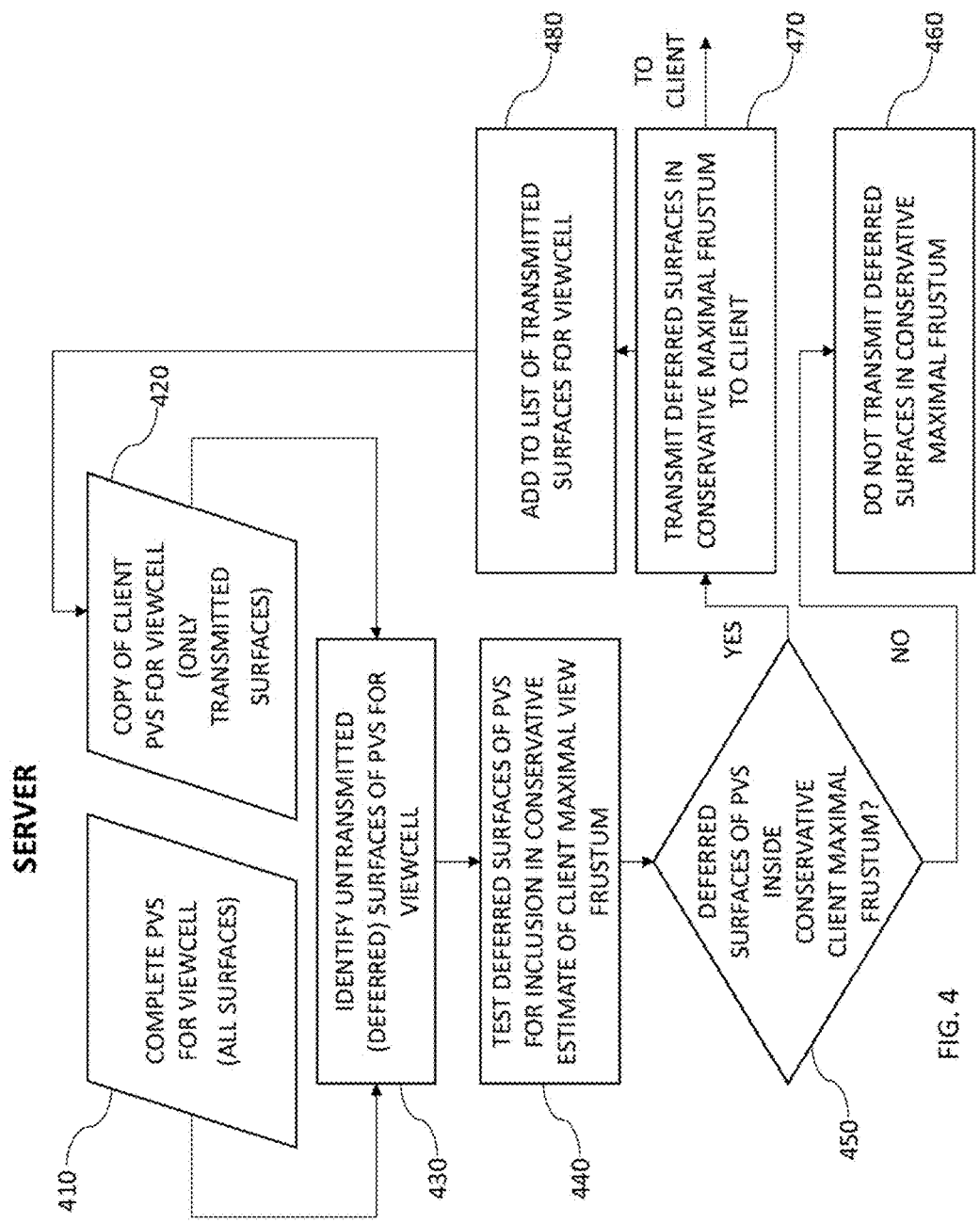
FIG. 4 is an exemplary flowchart showing a method of maintaining a shadow copy of a client's potentially-visible-set (PVS) for a specific viewcell, and testing untransmitted (deferred) surfaces for inclusion into a conservative estimate of the client's maximal view frustum, in order to determine whether or not to transmit the deferred surfaces to the client, according to an embodiment.

FIG. 4 is a flowchart showing the method of maintaining a shadow copy of the client's PVS for a specific viewcell, and testing untransmitted (deferred) surfaces for inclusion into the conservative estimate of the client maximal view frustum, in order to determine if these deferred surfaces should currently be transmitted to the client.

In FIG. 4, data store 410 represents the complete PVS for a particular viewcell. In exemplary disclosed embodiments, the specific viewcell represents a viewcell for which penetration by the client-user's viewpoint has already been predicted (using navigation prediction), and for which the relevant visibility event data (e.g., delta-PVS data) has already been transmitted to the client. The data store 410 is a representation of the PVS that includes all elements of the relevant delta-PVS and visibility event packet data have been added to the PVS. That is, the data store 410 is a representation of the viewcell PVS that assumes an omnidirectional view frustum.

In contrast, data store 420 represents a copy of the client PVS for the viewcell that includes only those renderable surfaces of the PVS that have actually already been transmitted to the client. The data store 420 reflects the fact that some of the renderable surfaces of the corresponding delta-PVS (visibility event packet data) may not have been transmitted at the time that the viewpoint was predicted to cross the viewcell to viewcell boundary corresponding to the visibility event packet. In exemplary embodiments of the disclosed method, the transmission of some of the renderable surfaces of a visibility event packet may be deferred if these surfaces are not within the conservative estimate of the client maximal view frustum.

Then, in step 430, the data stores 410 and 420 are used to determine those surfaces of the complete PVS that have not yet been transmitted to the client.

In step 440, the untransmitted surfaces are tested for inclusion in the conservative estimate of the client maximal view frustum. As described, in exemplary embodiments, this estimate of the client maximal view frustum is constructed by the server unit taking into account factors including the maximal extent of viewpoint penetration into the viewcell (which is a function of the viewpoint linear and angular velocity and acceleration) as well as the angular velocity and acceleration of the view direction vector, as well as other factors including the horizontal and vertical field-of-view and the network latency between the client and the server.

In decision step 450, it is determined if the deferred surface of the PVS for the viewcell is within the conservative estimate of the client maximal view frustum. If, in step 450, it is determined that the deferred renderable surfaces of the PVS are not within the conservative estimate of the client maximal view frustum, then processing continues to step 460, where the renderable surfaces not in the conservative estimate of the client maximal view frustum are not transmitted to the client. If, in step 450, it is determined that the deferred renderable surfaces of the PVS are within the conservative estimate of the client maximal view frustum, then processing continues to step 470, where the renderable surfaces not in the conservative estimate of the client maximal view frustum are transmitted to the client.

In step 480, the transmitted renderable surfaces are added to the list of the transmitted surfaces for the PVS as stored in data store 420.

These runtime methods can be employed effectively in cases where the predictability of navigation is high relative to the ping time. The predictability of navigation is a function of the maximal locomotive performance of the viewpoint and view direction vector, as is also determined by navigational constraints in the environment. As specified in copending U.S. application Ser. Nos. 14/754,419, 13/445, 792, and 13/420,436, these determinants of navigational predictability can be adaptively regulated by the visibility event packet streaming system in order to prevent late packet arrival, while insuring that the content is delivered to the user at a rate which is approximately matched to the spatiotemporal performance limits of the human or robotic client's vision system.

In exemplary embodiments, there is also described a method of using the extended view frustum to buffer against view direction vector rotation.

Figure 5A:
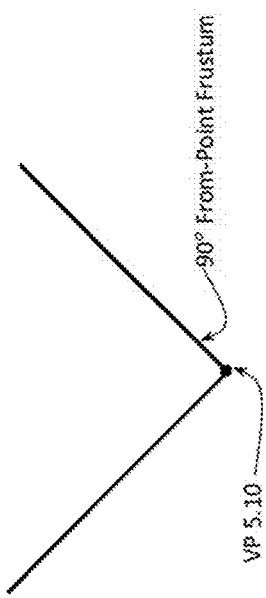
FIG. 5A is a diagram showing an exemplary viewpoint and a corresponding exemplary view frustum having a 90 degree horizontal field of view applicable to the viewcells of FIGS. 1-3, according to an embodiment.
Figure 5B:
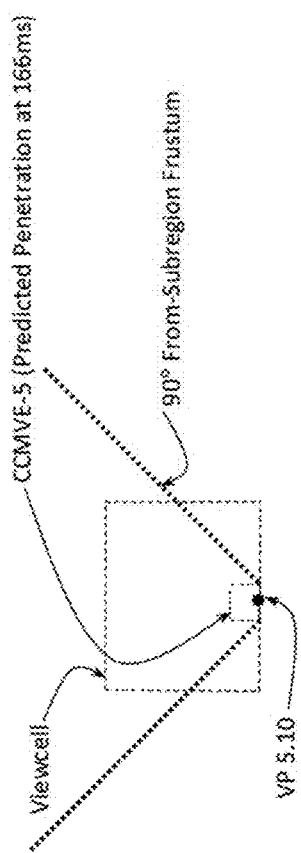
FIG. 5B is a diagram showing a conservative current maximal viewpoint extent (CCMVE) of penetration into a viewcell from a known position after 166 ms of elapsed time using the exemplary view frustum having a 90 degree horizontal field of view according to FIG. 5A.

For example, FIG. 5A shows a viewpoint, VP 5.10, and a corresponding view frustum having a 90 degree horizontal field of view. FIG. 5B shows a top-down view of a 90 horizontal field of view frustum enveloping the CCMVE-5. FIG. 5B also shows a conservative current maximal viewpoint extent, CCMVE-5, of penetration into the viewcell from a known position after 166 ms of elapsed time. As with CCMVE-2a, shown in FIG. 1, consistent with disclosed embodiments, CCMVE-5 is determined from a last known position and the maximal linear and angular velocity and acceleration of the viewpoint.

For example, for a typical 90 degree field of view such as the 90 degree from-point frustum shown in FIG. 5A, rotation rates of the frustum approaching 130 to 140 degrees per second (such as that of typical multiplayer action video games) can cause difficulty in aiming, especially for people older than 30 years of age, and can cause difficulty in viewing for a spectator. However, a 90 degree yaw ability to scan the environment is more suitable (such as that of more narrative-driven, cinematic campaign-type video games), such that aiming can be improved, and viewing would be more enjoyable for a spectator.

Figure 6:
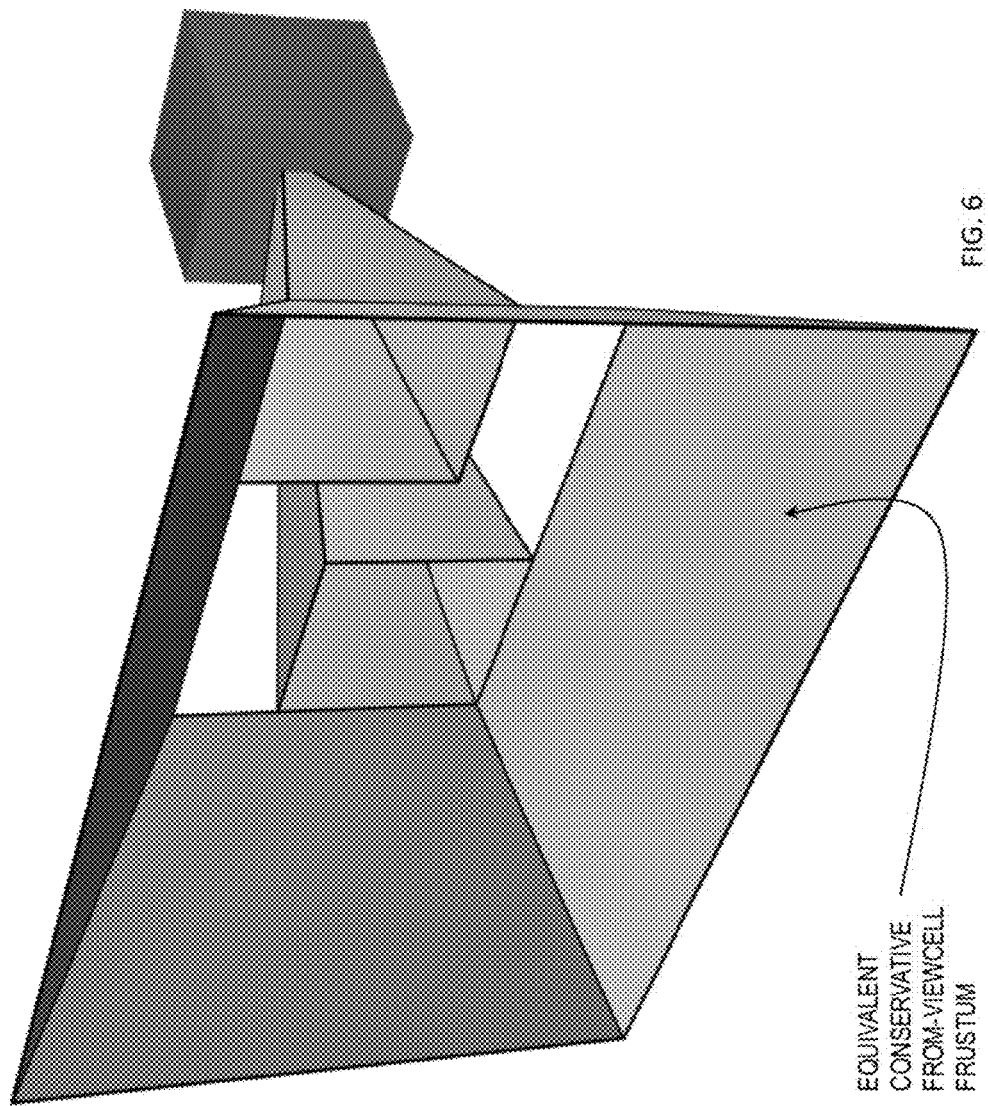
FIG. 6 is a diagram showing an exemplary method of determining a conservative from-region frustum enveloping a conservative current maximal viewpoint extent, for the general case in which the view direction vector is rotating during traversal of the viewpoint through the viewcell, and the viewpoint moves through a specified penetration subregion of the viewcell.

In exemplary embodiments, such a conservative from-region frustum enveloping a conservative current maximal viewpoint extent, such as CCMVE-5 shown in FIG. 5B, can be determined using the method specified in copending U.S. application Ser. Nos. 14/754,419, 13/445,792, and 13/420, 436. This is shown, for example, in FIG. 6, for the general case in which the view direction vector is rotating during traversal of the viewpoint through the viewcell, and the viewpoint moves through a specified penetration subregion of the viewcell. In the exemplary implementation shown in FIG. 5B, the view direction vector is assumed to have undergone no rotation during the 166 ms of viewcell penetration.

Figure 7:
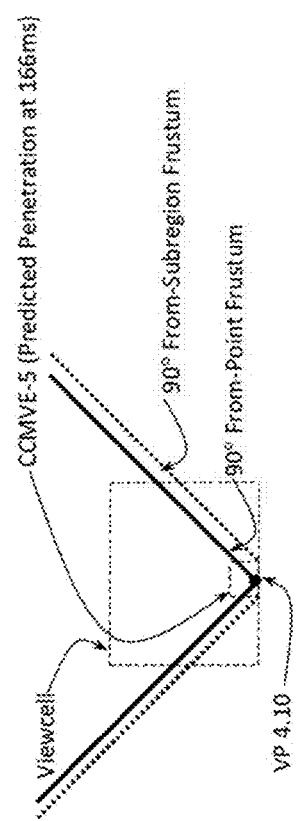
FIG. 7 is a diagram showing that the resulting conservative from-subregion frustum is larger than the corresponding from-point frustum, even if it assumed that no view direction vector rotation has occurred.

FIG. 7 shows that the resulting conservative from-subregion frustum is larger than the corresponding from-point frustum at viewpoint VP 4.10, even if it assumed that no view direction vector rotation has occurred, for a CCMVE-5 representative of predicted viewcell penetration at 166 ms.

Figure 8:
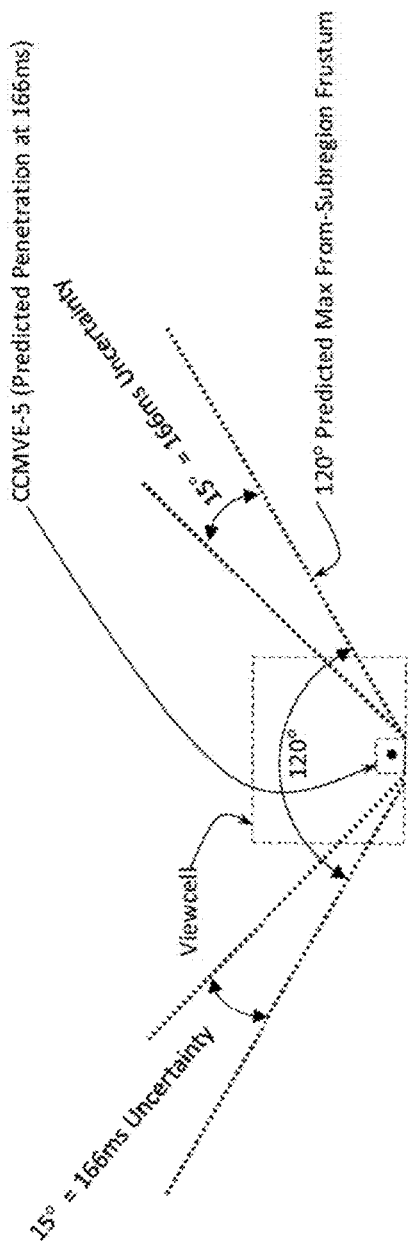
FIG. 8 is a diagram showing a resulting conservative from-subregion frustum that results from viewpoint penetration into the viewcell over 166 milliseconds for a CCMVE subregion, together with rotation of the view direction vector 15 degrees to the right or 15 degrees to the left from an initial view direction vector orientation.

FIG. 8 shows a resulting conservative from-subregion frustum that results from a CCMVE-5 representative of viewpoint penetration into the viewcell subregion over 166 milliseconds, together with rotation of the view direction vector 15 degrees to the right or 15 degrees to the left from an initial view direction vector orientation. In this exemplary case, assuming a maximum view direction rotation rate of 90 degrees per second, if the ping latency between the visibility event client and the server is 166 ms, the resulting 30 degree rotation would represent the uncertainty of the client's view direction vector, as experienced by the server. Accordingly, consistent with disclosed embodiments, the server can employ the extended 120 degree frustum (i.e., 120 degree predicted maximum from-subregion frustum) to determine the subset of the visibility event packet data to actually transmit to the client. This determination is made by determining the set of unsent surfaces of the corresponding visibility event packet that intersect the extended frustum. Once again, in exemplary disclosed embodiments, the visibility event packet data is precomputed using the method of first-order from region visibility as specified in copending U.S. application Ser. Nos. 14/754,419, 13/445,792, and 13/420,436. The set of surfaces belonging to the corresponding PVS, incrementally maintained using the delta-PVS VE packets, that have not already been sent is maintained using the technique of maintaining the shadow PVS on the server.

In some embodiments, the visibility event packets are precomputed assuming a full omnidirectional view frustum spanning 12.56 steradians of solid angle. Consistent with disclosed embodiments, the methods described in copending U.S. application Ser. Nos. 14/754,419, 13/445,792, and 13/420,436, may be employed to precompute the omnidirectional visibility event packets. As described, in exemplary disclosed embodiments, the visibility event server can employ the extended view frustum to cull portions of the precomputed visibility event packet that fall outside of the maximum possible predicted extent of the client view frustum, as determined from the ping latency and the maximal angular velocity and acceleration of the view frustum, as well as the maximum predicted extent of penetration of the viewpoint into the view cell. This method ensures that all of the potentially visible surfaces are transmitted, while minimizing bandwidth requirements, by deferring the transmission of VE packet surfaces that are not within the current conservative extended frustum, or which happen to be backfacing with respect to the conservative current maximal viewpoint extent of penetration into the viewcell.

In exemplary embodiments, there is also described a method of using reduced level-of-detail models in periphery of extended view frustum to reduce bandwidth requirements for buffering against view direction vector rotation, i.e., level-of-detail vs. predicted exposure durations.

The above-disclosed methods comprise determining a conservative representation of the client's view frustum from the temporal reference frame of the server, and using this extended frustum to cull those surfaces of the corresponding visibility event packet that could not possibly be in the client's view frustum. Consistent with disclosed embodiments, all of the transmitted surface information is represented at the highest level-of-detail. As described in copending U.S. application Ser. Nos. 14/754,419, 13/445,792, and 13/420,436, the visibility event packets can be encoded using geometric and surface models at a plurality of levels-of-detail, including a plurality of levels of geometric, texture, and other surface detail.

Figure 11:
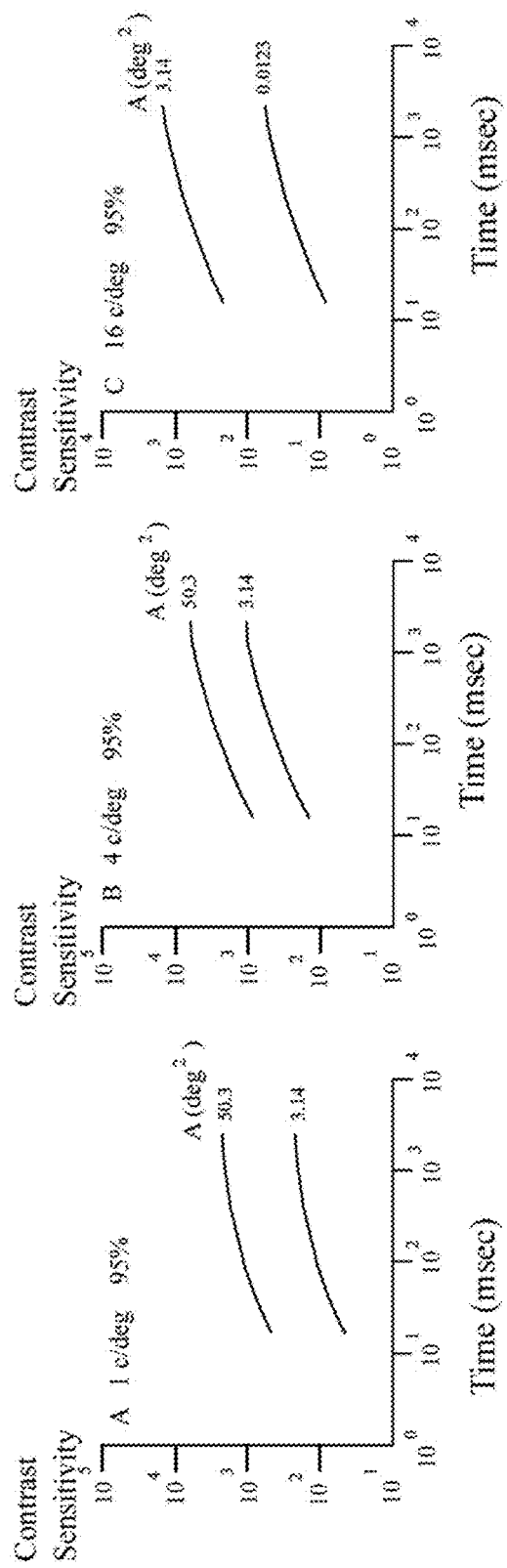
FIGS. 11A-11C show exemplary graphs of contrast sensitivity (visual acuity) as a function of exposure time for a human visual cortex.

In exemplary disclosed embodiments, however, the VE packets can be transmitted at a lower level-of-detail during periods of low bandwidth availability, and/or high bandwidth requirement, in order to maximize the probability that the information encoding newly exposed surfaces arrives on time (e.g., before the surface is actually exposed in the client viewport). As described in copending U.S. application Ser. Nos. 14/754,419, 13/445,792, and 13/420,436, under some conditions, a VE packet containing relatively low level-of-detail surface information can initially be transmitted and later replaced by a VE packet containing higher level-of-detail information. This exploits the fact that the human visual system has lower visual acuity for newly exposed surfaces. As shown in FIG. 11, for example, and as described in detail in copending U.S. application Ser. Nos. 14/754,419, 13/445,792, and 13/420,436, human visual acuity (expressed as contrast sensitivity on a logarithmic scale) is very limited during the first 400-500 milliseconds of exposure. That is, the human visual system's ability to perceive detail on a surface is very limited for the first 400-500 milliseconds that the surface is exposed to the visual system.

Figure 9:
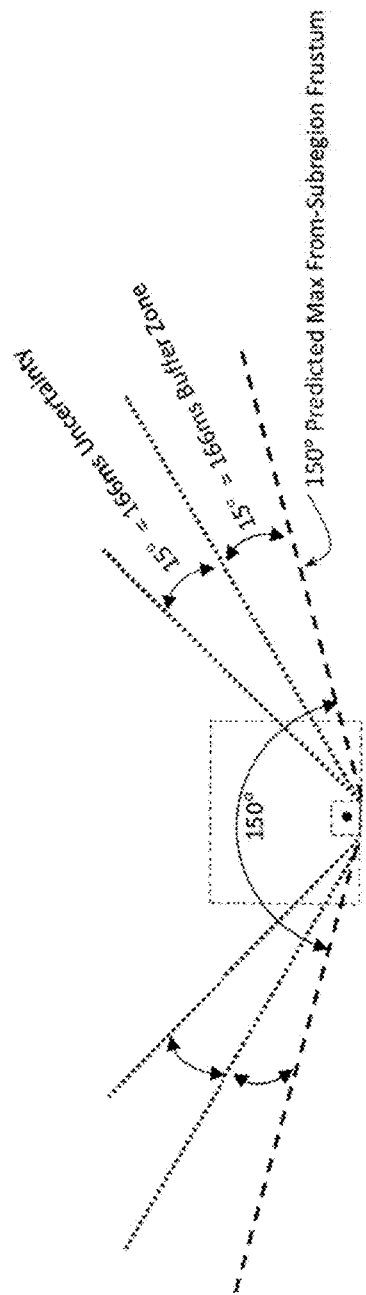
FIG. 9 is a diagram showing an additional angular region of an extended frustum compared to that shown in FIG. 8, which spans an additional 15 degrees on each side of an extended 120 degree frustum shown in FIG. 8.

In exemplary disclosed embodiments, this limitation of human visual performance (as well as the limited spatiotemporal performance of some robotic vision systems, including 3D map-matching navigation systems) can be exploited by sending low level-of-detail surface information if the surfaces fall outside the region of the extended view frustum, as determined, in exemplary embodiments, using one or more of the following pieces of information: the ping latency, the maximum viewpoint translation velocity and acceleration, the maximum angular velocity, and acceleration of the view direction vector. For example, FIG. 9 shows an additional angular region of extended view frustum that spans an additional 15 degrees on each side of the extended 120 degree frustum shown in FIG. 8. In exemplary embodiments, the visibility event server transmits surfaces that fall in the subfrustum between 120 degrees and the maximally extended frustum of 150 degrees at a lower level-of-detail than the other visibility event surface data that fall within the 120 degree extended frustum.

The disclosed method thus provides an additional buffer against view direction vector rotation, which may be useful if the directional visibility gradient (e.g., the rate of exposure of surfaces per degree of view direction vector rotation) is high, or if the available bandwidth has a high degree of variability (e.g., network jitter). In such exemplary embodiments, the low level-of-detail surface information can potentially be replaced by a higher level-of-detail representation. If the replacement occurs at a rate which exceeds the dynamic visual acuity performance curves of FIGS. 11A-11C, for example, then the switch can be difficult or impossible for viewers to perceive.

Figure 10:
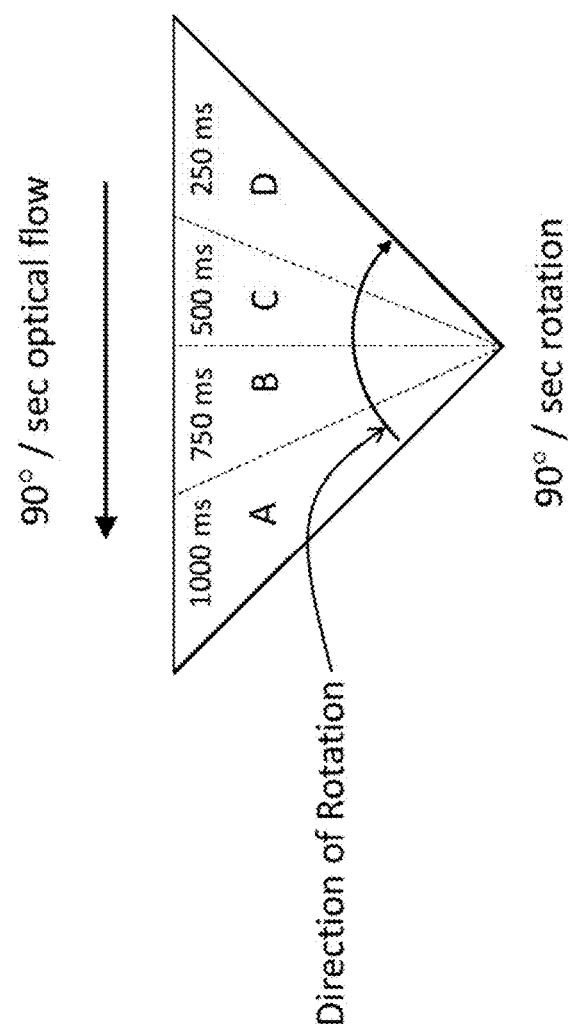
FIG. 10 is a diagram showing a top-down view of a view frustum having a horizontal field of view of 90 degrees, and undergoing rotation in the horizontal plane at a rate of 90 degrees per second.

FIG. 10 shows a top-down view of a view frustum having a horizontal field of view of 90 degrees, and undergoing rotation in the horizontal plane at a rate of 90 degrees per second in a direction from region A toward region D. In this exemplary case, surfaces to the right-hand side of the view frustum will undergo incursion into the rotating frustum at region D, whereas surfaces near the left-hand extreme of the view frustum at region A will exit the frustum during frustum rotation. In the exemplary case shown in FIG. 10, those surfaces in region A have been in the frustum for between 750 ms and 1000 ms as a consequence of exposure via regions D, C, and B during the rotation. In region B, for example, the surfaces have been in the frustum for between 500 ms and 750 ms; in region C, the surfaces have been in the frustum for between 250 ms and 500 ms; and in region D, the surfaces have been in the frustum for between 0 ms and 250 ms.

Figure 12:
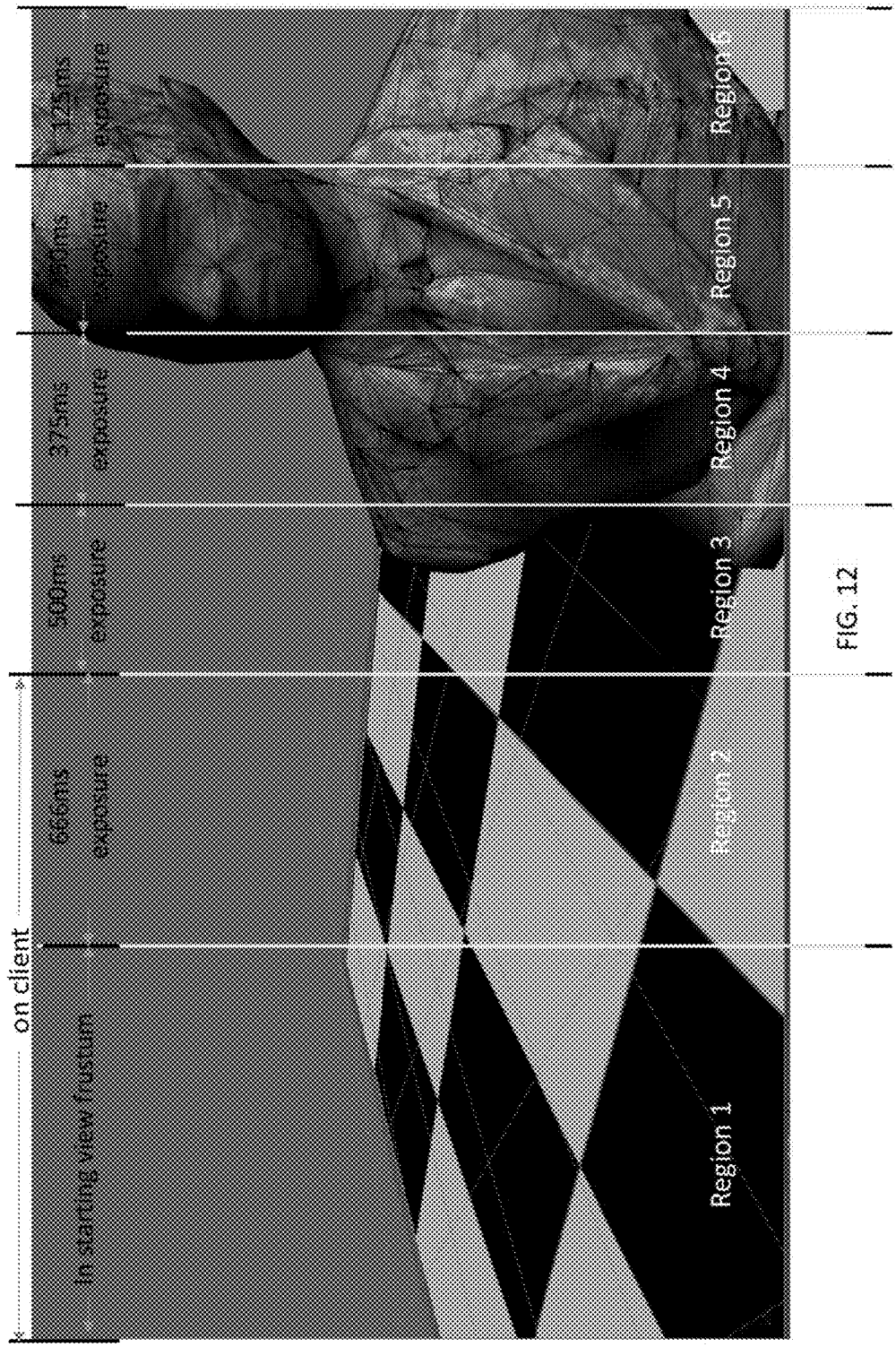
FIG. 12 is a diagram showing a video frame of a simulation of a state of rotation at an instant approximately 400 ms after initiation of full speed 60 degree view frustum rotation from rest to stop over a time period of 666 ms.

Surfaces that have been in the frustum for only a brief period of time have also been exposed to the client-user's visual system for a concomitantly brief period of time. For example, FIG. 12 shows a similar case of rotation of a 90 degree horizontal field-of-view frustum from rest (with instantaneous angular acceleration) to a view direction vector rotational velocity of 90 degrees per second in a direction from Region 6 toward Region 1, which is sustained for 666 ms, giving a rotation of 60 degrees. In this exemplary case, at the end of the rotation, those surfaces in Region 1 were in the frustum at the time the rotation began, as a consequence of exposure via Regions 6, 5, 4, 3, and 2 during the rotation. Also in this exemplary case, at the end of the rotation, those surfaces in Region 2 have been in the frustum from 500 ms to 666 ms, as a consequence of exposure via Regions 6, 5, 4, and 3 during the rotation. Also in this exemplary case, at the end of the rotation, those surfaces in Region 3 have been in the frustum from 375 ms to 500 ms, as a consequence of exposure via Regions 6, 5, and 4 during the rotation. Also in this exemplary case, at the end of the rotation, those surfaces in Region 4 have been in the frustum from 250 ms to 375 ms, as a consequence of exposure via Regions 6 and 5 during the rotation. Also in this exemplary case, at the end of the rotation, those surfaces in Region 5 have been in the frustum from 125 ms to 250 ms, as a consequence of exposure via Region 6 during the rotation. Also in this exemplary case, at the end of the rotation, those surfaces in Region 6 have been in the frustum from 0 ms to 125 ms.

FIG. 12, for example, thus shows the state of the rotation visible in the view frustum at an instant approximately 400 ms after the initiation of the rotation. In the example of FIG. 12, the depicted low level-of-detail graphical model of a statue was just outside of the view frustum immediately prior to the start of the view direction vector rotation. At 400 ms into the rotation, the depicted graphical model enters into visibility in Region 3 of the view frustum. In this case, no part of the depicted graphical model has been exposed to the visual system for more than 400 ms. Consequently, any client-user cannot perceive high frequency geometric or other surface detail of the model. In exemplary embodiments of the disclosed method, therefore, the server sends a low level-of-detail representation of the graphical model during initial view frustum incursion, since the client-user cannot initially perceive higher levels of detail.

Figure 13:
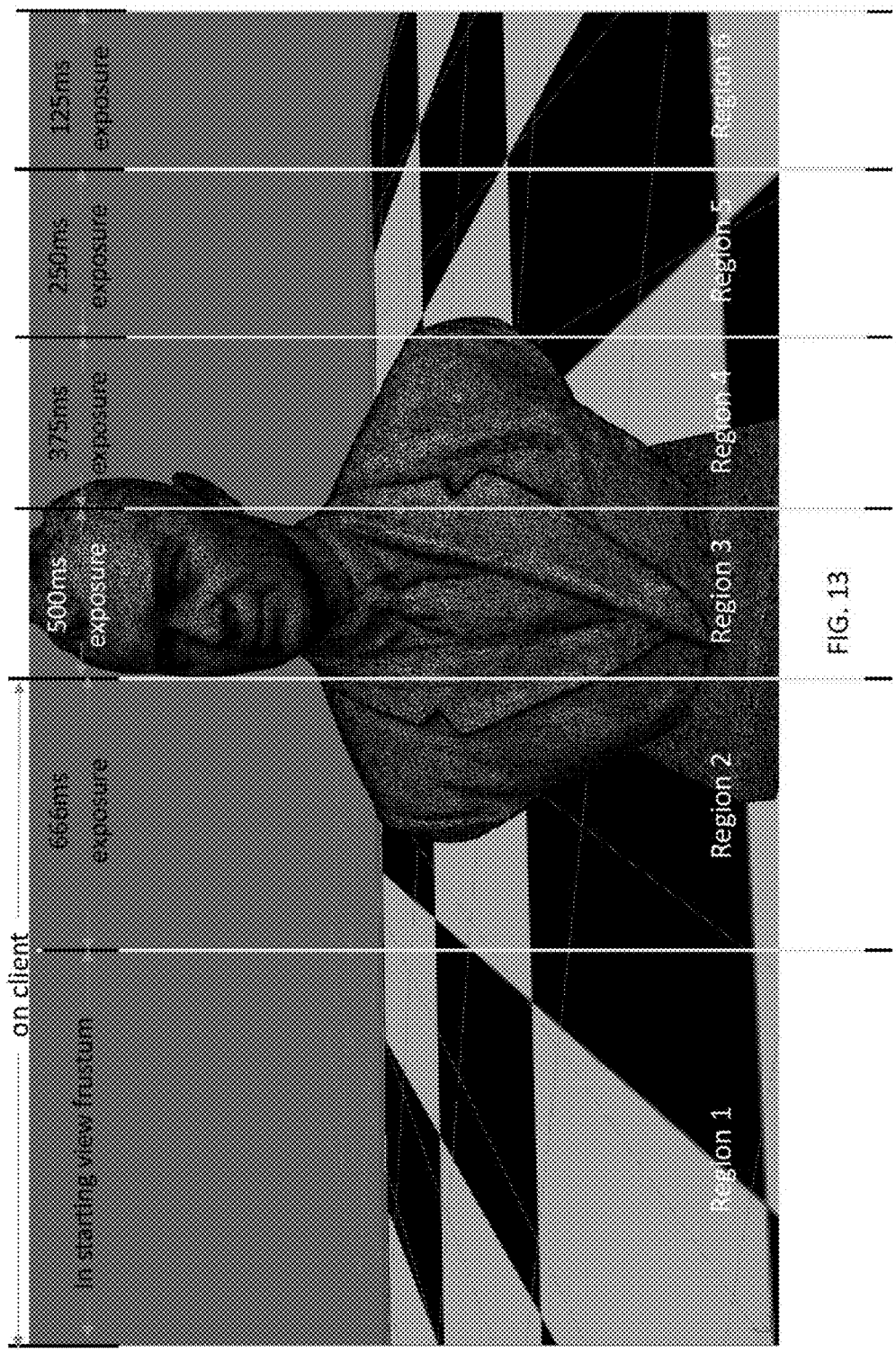
FIG. 13 is a diagram showing a later video frame, relative to that shown in FIG. 12, of a simulation of a state of rotation at an instant approximately 500 ms after initiation of full speed 60 degree view frustum rotation from rest to stop over a time period of 666 ms.

In exemplary disclosed embodiments, as the exposure time of the graphical model increases, the low level-of-detail model initially streamed by the visibility event server can be replaced by a higher level-of-detail model. For example, FIG. 13 shows a later time window of the same view frustum rotation shown in FIG. 12. In FIG. 13, however, the initial low level-of-detail graphical model of the statue has been replaced by a higher level-of-detail model. In this case, the higher level-of-detail model has 20 times the number of polygons as the lower level-of-detail initially streamed by the visibility event server and displayed by the visibility event client shown in FIG. 12. The graphical model of the statue in FIG. 13 also has texture maps that are 20 times the resolution of the texture maps belonging to the lower level-of-detail model shown in FIG. 12.

Thus, according to exemplary embodiments of the disclosed method, the visibility event server initially streams the lower level-of-detail models as they initially penetrate the view frustum. In exemplary disclosed embodiments, these streamed lower level-of-detail models may be low level-of-detail versions of graphical models that exist just outside of the maximal instantaneous conservative view frustum, for example, in the regions labeled 166 ms Buffer Zone in FIG. 9.

In exemplary disclosed embodiments, this pre-transmission of the low level-of-detail graphical model as shown in FIG. 12 prevents missing surfaces in transmitted VE packets, and allows for additional time to transmit the higher level-of-detail representation for presentation later in the view frustum incursion, that is, when the surfaces of the graphical model have been exposed to the client-user's visual system for a longer period, and are therefore able to be resolved with higher visual acuity. If this replacement occurs faster than the contrast sensitivity (visual acuity) vs. exposure time curves of FIGS. 11A-11C, then it is difficult or impossible for human client-user's visual system to perceive the switch from the displayed low level-of-detail model to the displayed higher level-of-detail model. In exemplary disclosed embodiments, the transition between displaying the low level-of-detail representation and the high level-of-detail representation is made to occur over several frame display intervals, with blending during the transition. This technique further masks the transition.

As shown in FIGS. 12 and 13, the depicted graphical model of a statue corresponds to frames from a video showing a simulation in which the 666 ms view frustum rotates at 60 frames per second. In this case, the rotation requires 40 frame intervals (all image frames being computed on the visibility event client system). For the initial 500 ms of the rotation, only the low level-of-detail graphical model is displayed in the video. In the final 166 ms of the rotation, the higher level-of-detail model, which has arrived at the visibility event client, is then displayed. In the video, it is very difficult for human viewers to see that a very low level-of-detail model (e.g., having only 5% the detail of the final model) was initially displayed. The inability of human viewers to perceive the transition is, in part, caused by one of the specific limitations of human dynamic visual acuity: limited acuity at low surface exposure times.

Exemplary embodiments of the disclosed method also send and/or display different component surfaces of a single graphical model at different levels-of-detail, depending on the exposure duration of the component surfaces. For example, in the case of the low level-of-detail and high level-of-detail representations of the graphical statue model of FIGS. 12 and 13, respectively, the component surfaces of the model's right shoulder can be transmitted and displayed at a higher level-of-detail than the component surfaces of the model's left shoulder, since the right shoulder surfaces are exposed to the client-user's visual system for a longer period of time before the left shoulder surfaces would become exposed to the client-user's visual system for the same longer period of time.

In exemplary embodiments, there is also described a method of using reduced level-of-detail models in the periphery of an extended view frustum to reduce bandwidth requirements for buffering against view direction vector rotation, i.e., level-of-detail vs. estimated image-space velocity and retinal slip.

As described above, visual acuity (i.e., the ability to resolve spatial detail) is markedly limited at low exposure times. Visual acuity is also limited for surfaces that are moving at a substantial angular velocity in the image plane. This limitation results because the oculomotor system has a finite gain in smoothly pursuing rapidly moving targets in the image plane/visual field. For any moving visual targets that are not perfectly pursued by the oculomotor system, the projection of the object will actually be moving on the retina. This motion of image elements relative to the retina is called retinal slip. The visual system has limited visual acuity for elements that are moving on the retina. Since these moving image elements are not stabilized in space-time on the rods and cones of the retina, or on subsequent neural visual processing systems (e.g., the lateral geniculate nucleus of the thalamus, area 17 of the visual cortex, etc.), they are incompletely processed and incompletely resolved.

Figure 14B:
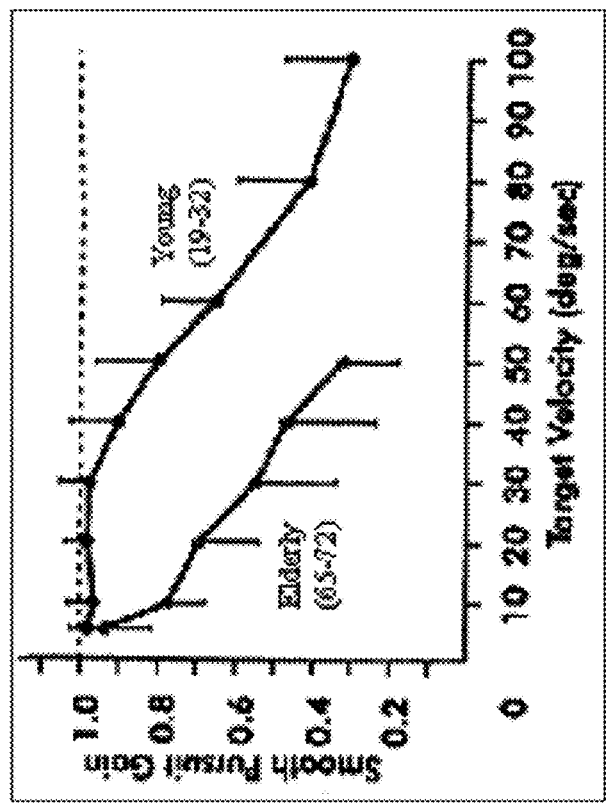
FIG. 14B is an exemplary graph showing the gain of the oculomotor smooth pursuit system of a human visual cortex for tracking targets at various angular velocities.
Figure 14A:
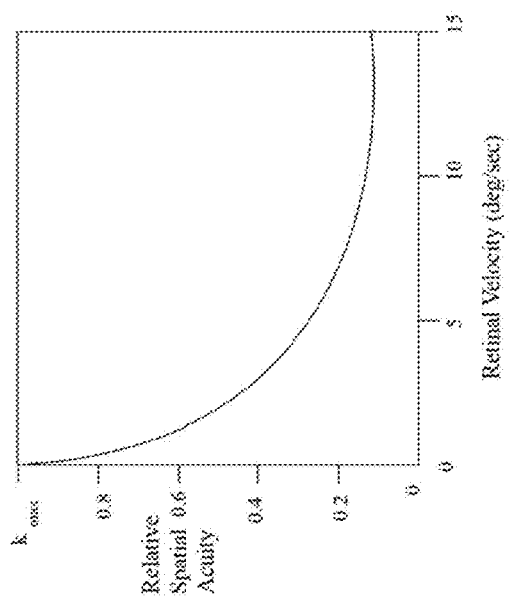
FIG. 14A is an exemplary graph showing that the relative spatial acuity of a human visual cortex is reduced by approximately 90% when a target surface is moving at 10 degrees per second on the retina.

FIG. 14A shows that the relative spatial acuity is reduced by approximately 90% when the target surface is moving 10 degrees per second on the retina. FIG. 14B shows the gain of the oculomotor smooth pursuit system for tracking such targets at various angular velocities. Two gain curves are shown, one for young subjects (labeled Young) and another for older subjects (labeled Elderly). For young subjects, target velocities above 30 degrees per second are imperfectly tracked, which causes retinal slip. For example, at a target velocity of approximately 50 degrees per second, the gain of the smooth pursuit oculomotor tracking system is approximately 80%, resulting in a retinal slip of approximately 10 degrees per second and a decrease in acuity of approximately 90%. For the older subjects, a much slower target velocity of only 15 degrees per second causes the same degree of retinal slip and loss of acuity.

In exemplary embodiments of the disclosed method, the technique of initially sending/display low level-of-detail models during frustum incursion also exploits the fact that graphical surfaces have an image plane velocity that is generally proportional to the angular velocity of the view direction vector. Consequently, even as the exposure time of the graphical surfaces increase with increasing incursion into the view frustum, the ability of the human visual system to perceive detail can still be significantly limited if the frustum continues to rotate. If the horizontal rotation of the view frustum exceeds the horizontal field-of-view of the frustum, then graphical surfaces that enter the view frustum will still be moving on the image plane as they exit the other side of the view frustum. In some cases, this results in graphical surfaces that may be poorly resolved during their entire lifespan in the view frustum. In these cases, exemplary embodiments of the present method send only low level-of-detail representations of the graphics surfaces, without replacement.

I claim:

1. A method, conducted on a server, of predictive prefetching and transmitting at least one partial visibility event packet from the server to a client device, the at least one partial visibility event packet being a subset of a complete visibility event packet, the complete visibility event packet including renderable graphics information occluded from a first viewcell and not occluded from a second viewcell among a plurality of viewcells, the method comprising:
   a) storing, using storage circuitry, information representing a current client view frustum;
   b) storing, using the storage circuitry, renderable graphics information previously transmitted to the client device;
   c) determining, using a processor, a conservative from-region view frustum from the information representing the current client view frustum, the conservative from-region view frustum comprising an estimated maximal client view frustum having at least one polygonal boundary that is attached to an edge of a viewcell or viewcell subregion and enclosing a volume of space intersected by a maximum possible rotational and translational movement of the current client view frustum during a delay period of time at least equal to a round-trip-time of data communication between the server and the client device;
   d) calculating, using the processor, the subset of the complete visibility event packet comprising renderable graphics information that is included in the estimated maximal client view frustum;
   e) determining, using the processor, whether the calculated subset has previously been transmitted to the client device by comparing the calculated subset to the stored renderable graphics information previously transmitted to the client device; and
   f) transmitting, to the client device, the at least one partial visibility event packet comprising the calculated subset of the complete visibility event packet, if the calculated subset has not been previously transmitted to the client device.

2. The method according to claim 1, wherein the information representing the client view frustum includes a current client view direction vector.

3. The method according to claim 2, wherein the information representing the client view frustum includes a current client viewpoint location.

4. The method according to claim 3, further comprising determining the estimated maximal client view frustum by:
   c1) determining, using the processor, a conservative maximal viewpoint extent comprising a representation of a maximal possible subregion of the second viewcell occupied by a client viewpoint during the delay period;
   c2) determining, using the processor, a conservative maximal view direction vector rotation comprising a representation of a maximal rotational extent of the client view direction vector during the delay period; and
   c3) calculating, using the processor, the estimated maximal client view frustum from the conservative maximal viewpoint extent and the conservative maximal view direction vector rotation.

5. The method according to claim 4, wherein the information representing the client view frustum includes a current velocity of the current client viewpoint.

6. The method according to claim 5, wherein the determining the conservative maximal viewpoint extent is based on the current client viewpoint location, the current velocity of the client viewpoint, and a predetermined maximal value for viewpoint velocity.

7. The method according to claim 4, wherein the information representing the client view frustum includes a current acceleration of the current client viewpoint.

8. The method according to claim 4, wherein the information representing the client view frustum includes a current angular velocity of the current client view direction vector.

9. The method according to claim 4, wherein the information representing the client view frustum includes a current angular acceleration of the current view direction vector.

10. The method according to claim 9, wherein the conservative maximal view direction vector rotation is based on the current client view direction vector, a current angular velocity of the current client view direction vector, and a predetermined maximal value for the client view direction vector angular velocity.

11. The method according to claim 4, further comprising:
    g) storing, using the storage circuitry, a complete omnidirectional potentially visible set of data for each viewcell of the plurality of viewcells;
    h) storing, using the storage circuitry, a deferred data set for said each viewcell of the plurality of viewcells that is predictively penetrated by the client viewpoint, as determined by the conservative maximal viewpoint extent, the deferred data set representing a subset of the complete omnidirectional potentially visible set that has not been transmitted to the client device in step f);

i) calculating, using the processor, at least one partial visibility event packet for said each viewcell of the plurality of viewcells that is predictively penetrated by the client viewpoint, the partial visibility event packet comprising the deferred data set for the viewcell that intersects the estimated maximal client view frustum; and j) transmitting, to the client device, at least one deferred rotational visibility event packet comprising deferred data when the deferred data set intersects the estimated maximal client view frustum.

12. A method, conducted on a client device, of receiving at least one partial visibility event packet from a server, the at least one partial visibility event packet being a subset of a complete visibility event packet, the complete visibility event packet including renderable graphics information occluded from a first viewcell and not occluded from a second viewcell among a plurality of viewcells, the method comprising:

a) transmitting to the server, using a processor, client view information representing a current client view frustum;

b) transmitting to the server, using the processor, data comprising at least one of a current client view direction vector and a current client viewpoint location; and c) receiving, from the server, the at least one partial visibility event packet comprising renderable graphics information that intersects a maximal client view frustum, wherein the maximal client view frustum is part of a conservative from-region view frustum and has at least one polygonal boundary that is attached to an edge of a viewcell or viewcell subregion and encloses a volume of space intersected by a maximum possible rotational and translational movement of the current client view frustum, based on said at least one of the current client view direction vector and the current client viewpoint location, during a delay period of time at least equal to a round-trip-time of data communication between the server and the client device.

13. The method according to claim 12, further comprising:

d) receiving, from the server, at least one deferred visibility event packet for said each viewcell of the plurality of viewcells that is predictively penetrated by the client viewpoint, the at least one deferred visibility event packet including, for said each viewcell, a subset of the complete potentially visible set not previously received from the server, wherein the subset includes renderable graphics information of the at least one deferred visibility event packet that intersects the maximal client view frustum.

14. A method, conducted on a client device, of receiving at least one partial visibility event packet from a server, the at least one partial visibility event packet being a subset of a complete visibility event packet, the complete visibility event packet including renderable graphics information occluded from a first viewcell and not occluded from a second viewcell among a plurality of viewcells, the method comprising:

a) determining, using a processor, client view information representing a current client view frustum and at least one of a current client view direction vector and a current client viewpoint location;

b) determining a conservative from-region view frustum from the client view information, the conservative from-region view frustum comprising a maximal client view frustum having at least one polygonal boundary that is attached to an edge of a viewcell or viewcell subregion and enclosing a volume of space intersected by a maximum possible rotational and translational movement of the current client view frustum, based on said at least one of the current client view direction vector and the current client viewpoint location, during a delay period of time at least equal to a round-trip-time of data communication between the server and the client device;

c) transmitting to the server, using the processor, data representing the maximal client view frustum; and d) receiving, from the server, the at least one partial visibility event packet comprising renderable graphics information that intersects the maximal client view frustum.

* * * * *